Jan. 30, 1968  S. B. McNALLY  3,366,379
AIR SPRING

Filed Oct. 23, 1965  2 Sheets-Sheet 1

INVENTOR
SELLERS B. McNALLY

BY Cushman, Darby & Cushman
ATTORNEYS

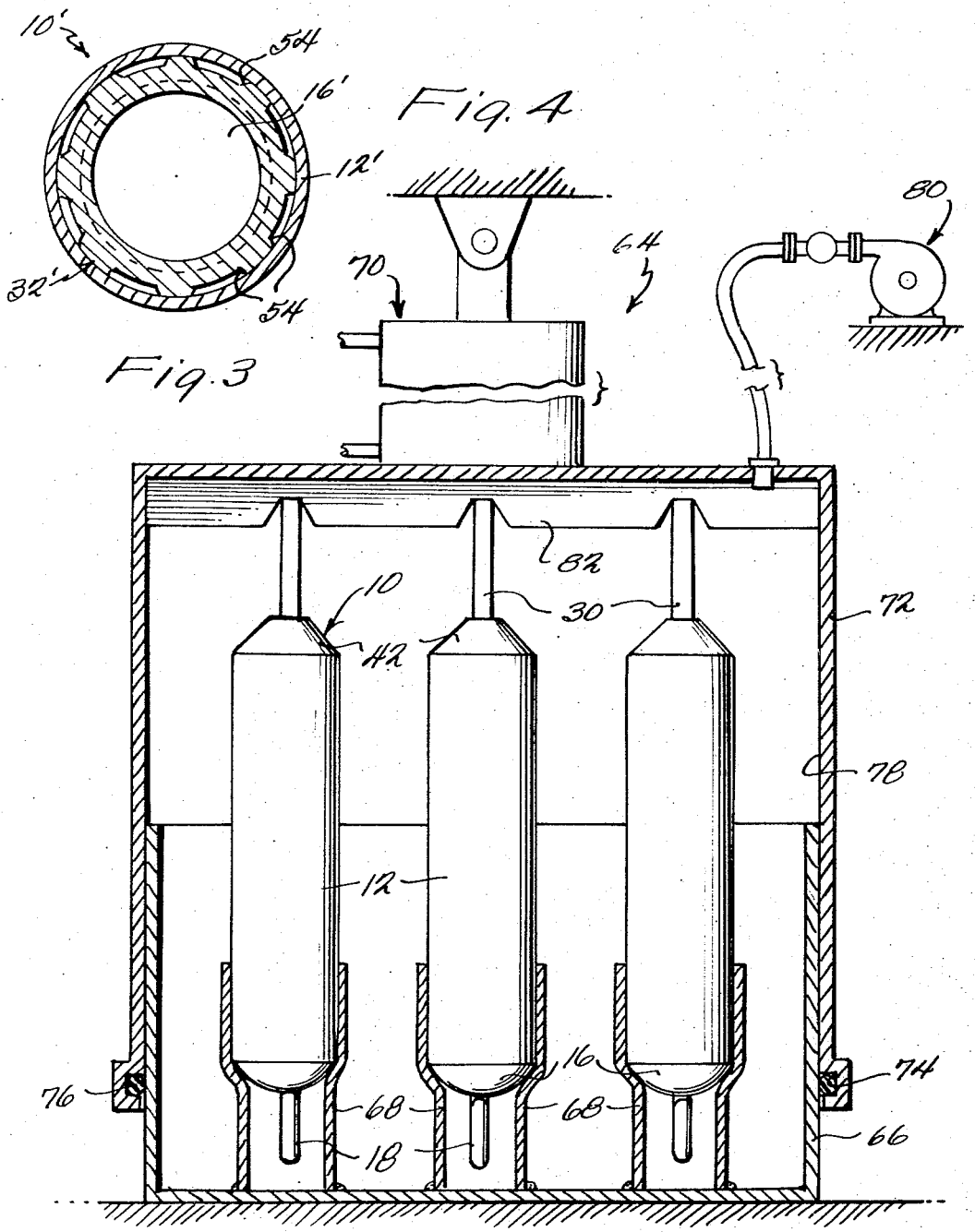

United States Patent Office 3,366,379
Patented Jan. 30, 1968

3,366,379
AIR SPRING
Sellers B. McNally, Chicago, Ill., assignor to Maremont Corporation, Chicago, Ill., a corporation of Illinois
Filed Oct. 23, 1965, Ser. No. 503,404
7 Claims. (Cl. 267—65)

This invention relates to springs and more particularly to an improved air spring unit of the piston and cylinder type and a novel method for introducing the charge of air under pressure into the unit, which method makes possible a simple and economic construction of the unit.

Air springs of the piston and cylinder type are known. Such units heretofore have been provided with conventional tire valves through which the charge of air under pressure is introduced.

An object of the present invention is the provision of an air spring unit of the piston and cylinder type having a piston rod seal which serves not only as a means for preventing escape of air under pressure from the unit, but also as a check valve means wherein air under pressure is introduced into the unit thus eliminating the necessity and expanse of providing a conventional tire valve.

Another object of the present invention is the provision of an air spring unit of the type described having an improved piston rod seal means which serves as the sole means for introducing air under pressure into the unit and effectively prevents escape of air from the unit throughout its life.

In accordance with the principles of the present invention, an air spring unit embodying an improved piston rod seal means is charged with air under pressure by communicating at least the exterior portion of the unit adjacent the piston rod seal with a controllable air chamber and introducing air into the controllable air chamber at a pressure sufficient to move the piston rod seal out of sealing engagement of the unit, thus allowing the air pressure within the controllable air chamber to enter the air spring unit and charge the same with air under a desired pressure. Preferably, the introduction of air under pressure into the unit is simultaneously accomplished by inward movement of the piston rod of the unit as well as a decrease in the volume of the controllable air chamber.

Accordingly, it is a further object of the present invention to provide a method of introducing a charge of air under pressure into an air spring unit of the type described which is effective through the piston rod seal of the unit and thus eliminates the necessity of providing the unit with a conventional tire valve or the like.

Still another object of the present invention is the provision of an air spring unit of the piston and cylinder type which is simple in construction, effective in operation, and economical to manufacture.

These and other objects of the present invention will become more apparent during the course of the following detailed description and appended claims.

The invention may best be understood with reference to the accompanying drawings wherein illustrative embodiments are shown.

In the drawings:

FIGURE 3 is a sectional view taken along the line 3—3 of FIGURE 2; and

FIGURE 4 is a somewhat schematic view illustrating apparatus for performing the method of the present invention for introducing the charge of air under pressure into a plurality of air spring units.

Figure 1:
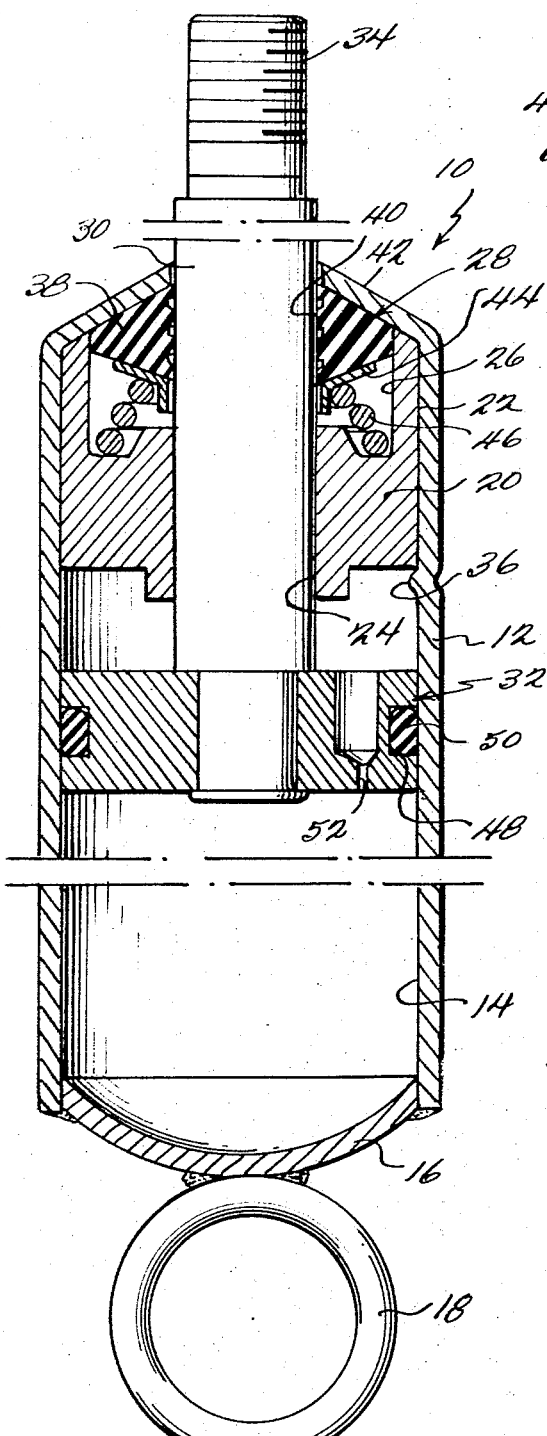
FIGURE 1 is a vertical sectional view of one form of an air spring unit embodying the principles of the present invention.

Referring now more particularly to FIGURE 1, there is shown therein a damped air spring unit, generally indicated at 10, which embodies the principles of the present invention. As shown, the unit 10 includes a cylindrical tube 12 defining a cylindrical pressure chamber 14 therein. One end of the tube 12 is sealed as by a closure member 16 having a connector 18 secured to the central portion thereof. As shown, the connector is of the ring type although it will be understood that other types of connectors, such as a stud connector or the like, may be used in lieu thereof.

Mounted within the opposite end portion of the cylindrical tube 12 is a rigid member 20 having a cylindrical exterior periphery 22 disposed in engagement with the interior periphery of the cylindrical tube 12. The rigid member 20 is provided with a central bore 24 having a counterbore 26 formed in one end thereof defining a recess for receiving a piston rod seal means, generally indicated at 28, constructed in accordance with the principles of the present invention.

The bore 24 of the rigid member 20 is adapted to provide a sliding bearing surface for a piston rod 30, one end portion of which extends inwardly of the chamber 14 and has a piston assembly, generally indicated at 32, connected therewith. The opposite end portion of the piston rod 30 extends outwardly of the bore 24 and is slidably, sealingly engaged by the seal means 28. The outer extremity of the piston rod is provided with a connector 34. As shown, the connector 34 is of the stud type constituting threads formed on the extremity of the piston rod although again, it will be understood that ring and other types of connectors may be utilized if desired.

The unit 10, as shown in FIGURE 1, is assembled by first engaging the piston with the piston rod attached thereto within the chamber 14 of the tube 12 through the end thereof opposite from the end closure 16. Next, the rigid member 20 is inserted over the outwardly extending end of the piston rod 30 and into the adjacent end portion of the tube 12 until the inner end thereof engages projections 36 formed on the interior periphery of the tube in spaced relation to the adjacent end thereof. The seal means 28 is then engaged over the outwardly extending end of the piston rod 30 and is moved within the recess 26. Finally, the adjacent end portion of the cylindrical tube 12 is turned over the outer end of the rigid member 20 and the seal means 28.

The seal means 28 preferably comprises an annular sealing member 38 made of a suitable sealing material such as rubber or the like. The annular sealing member 38 is provided with a central opening 40 of a size to sealingly engage the cylindrical peripheral surface of the piston rod 30. Preferably, the opening 40 may have a series of axially spaced annular grooves formed therein so that the piston rod engaging surface constitutes a series of axially spaced annular lips.

The annular sealing member 38 is preferably shaped so as to present an outwardly converging isosceles trapezoidal configuration in section. The outer periphery of this sealing member engages within the interior periphery of the recess 26, while the outer frusto conical surface of the annular sealing member engages the turned over end portion of the cylindrical tube. In this way, the turned over end portion constitutes an annular wall 42 against which the sealing member 38 sealingly abuts. The inner frusto conical surface of the annular sealing member 38 is engaged by a rigid spring retainer element 44 against which one end of a spiral spring 46 engages. The opposite end of the spiral spring 46 seats within the bottom of the recess 26.

It will be seen that the spring 46 serves to resiliently bias the annular sealing member 38 into sealing engagement with the annular wall 42 and into sealing engagement with the periphery of the piston rod 30. In normal operation of the unit 10, the spring serves to effectively maintain this sealing engagement even as wear may occur to the sealing member as a result of repeated movements of the piston rod 30.

Of particular significance with respect to the present invention, however, is the fact that the sealing means 28 serves as a means through which air under pressure is introduced into the unit after assembly has been completed. In accordance with the method of the present invention, hereafter to be more fully described, spring 46 serves to yieldingly maintain the sealing member 38 in sealing engagement with the annular wall 42 so that during the air charging operation, the annular sealing member 38 will move out of sealing engagement therewith. In this way, the seal means 28 serves not only as a means for effecting a positive lifetime seal to prevent air under pressure from escaping from the unit 10, but also as the sole means by which air under pressure may be initially introduced into the unit.

In this regard, it will be noted that the rigid member 20 is preferably made of sintered iron which is of a sufficiently porous nature as to permit air under pressure to pass therethrough. Alternatively, the exterior periphery of the rigid member engaging the interior of the cylindrical tube 12 may be formed with annularly spaced longitudinally extending grooves where a non-porous material such as an aluminum alloy or the like is employed.

The unit 10 as disclosed in FIGURE 1 is of the damped type, the periphery of the piston assembly 34 being formed with an annular groove within which an O-ring seal 50 is mounted in sealing engagement with the interior periphery of the cylindrical tube. The O-ring seal 50 thus positively prevents the passage of air within the chamber 14 along the periphery of the piston and the passage of air in response to the movement of the piston is controlled by accurately predetermining the size of a restricted passage 52 formed in the piston 32 in communicating relation to the opposite sides thereof.

Figure 2:
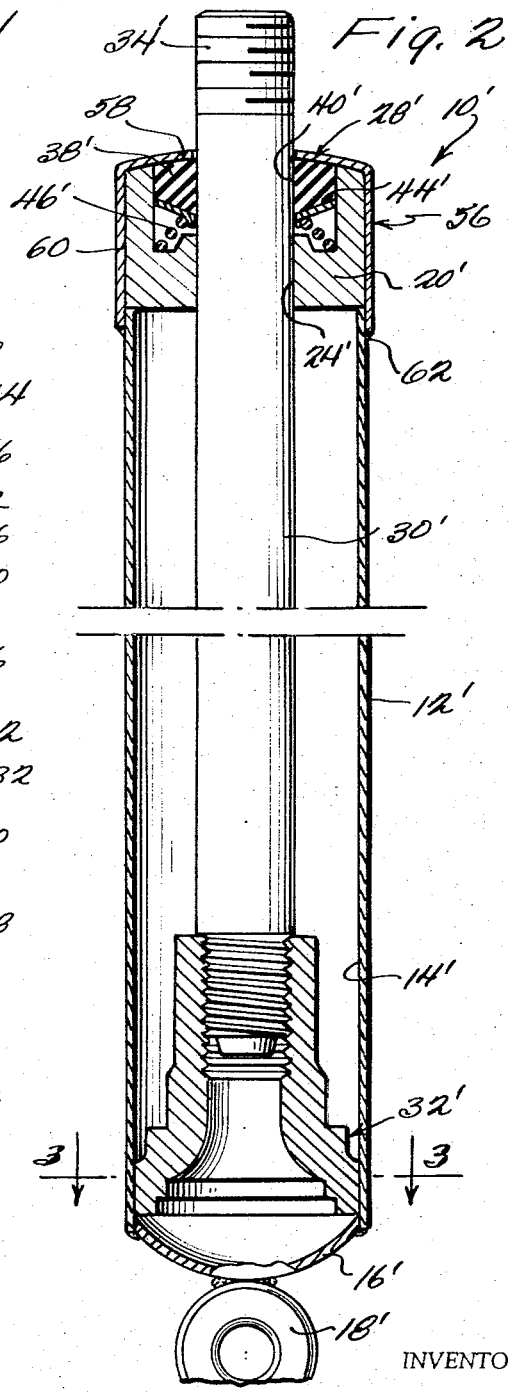
FIGURE 2 is a view similar to FIGURE 1 showing another form of an air spring unit embodying the principles of the present invention.

An undamped air spring unit 10′ is illustrated in FIGURE 2 in which corresponding parts are designated by corresponding primed numerals. The unit 10′ includes a piston assembly 32′ having its exterior periphery formed with a series of annularly spaced longitudinally extending grooves 54 (FIGURE 3), which grooves provide for generally unrestricted flow of air within the chamber on opposite sides of the piston assembly 32′.

The air spring unit 10′ also illustrates other preferred alternative constructions in accordance with the principles of the present invention. For example, in lieu of the turned in end construction of the unit 10 and mode of assembly associated therewith, the unit 10′ includes an end cap member 56. The end cap 56 is formed in a generally cup shaped configuration having a centrally apertured base 58 which defines the annular sealing member engaging wall. Extending from the periphery of the base 58 is a peripheral wall 60 of a size to engage over the end of the cylindrical tube 12′. The rigid member 20′ is of a size to engage within the peripheral wall 60 in abutting engagement with the adjacent edge of the cylindrical tube 12′. It will be understood that with the end cap construction the rigid member 20′ and seal means 28′ is initially inserted within the end cap 56, and then the latter is engaged over the open end of the cylindrical tube 12′ and fixedly secured thereto as by welding or the like, as indicated at 62.

It will also be understood that other constructions may be employed, for example, rather than providing an end cap 56 as shown in FIGURE 2 or turning in the end of the cylindrical tube 12, as shown in FIGURE 1, the annular sealing member engaging wall may be provided as a separate piece and welded along its periphery to the adjacent edge of the cylindrical tube after the rigid member and seal means have been inserted in the end of the cylindrical tube.

While the two embodiments shown and described above differ functionally primarily in the damping ability, it will be understood that the air spring unit of the present invention may be provided with any desired load and spring rate characteristic, as well as damping characteristic. Load and spring rate relationships may be varied by varying the diameter size of the bore 14 in relation to the diameter size of the piston rod, by varying the tube length with a given stroke length or by reducing the air volume by the addition of hydraulic fluid inside the unit. The load is determined by the formula: $L=PA$; where L is the load; P is the air pressure and A is the piston rod area. The spring rate is determined by the formula:

$$R=\frac{CPA^2}{V}$$

where R is the spring rate; C is the constant of compression and expansion (1 for extremely slow operation, up to 1.35 for fast action); P is the air pressure; A is the piston rod area; and V is the volume of gas within the unit.

Method

Referring now more particularly to FIGURE 4, there is illustrated therein somewhat schematically, an apparatus, generally indicated at 64 for carrying out the method of the present invention for introducing an initial charge of air under pressure within a plurality of air spring units 10. As shown, the apparatus 64 includes a cylindrical receptacle 66 having an open top and a plurality of fixtures 68 for receiving and supporting a plurality of air spring units 10 therein with the piston rod ends extending upwardly above the open top thereof. Mounted above the receptacle 66 for vertical reciprocating movement, as by a hydraulic ram 70 or the like, is a cooperating cylindrical cover 72. As shown, the cover 72 has its lower end open and is provided with an interior annular groove 74 for receiving an O-ring seal 76 adapted to sealingly engage the exterior periphery of the receptacle 66.

In performing the method of the present invention with the apparatus 64, units 10 are mounted within the fixtures 68 in the lower receptacle 66 with the upper cover 72 disposed in spaced relation thereto. After the units 10 have been properly positioned within the fixtures 68, the upper cover 72 is lowered by the operation of the hydraulic ram 70 until the O-ring seal 76 engages the upper edge of the lower receptacle 66. In this position, the receptacle 66 and cover 72 define a closed air chamber, indicated at 78, within which the units 10 are mounted and which communicates with the seal means 28 thereof through the central opening in the annular wall 42.

The apparatus 64 also includes a source of air under pressure, shown schematically as an air compressor 80, the outlet of which is connected through suitable valves and conduit to the air chamber 78. As soon as sealing engagement of the O-ring seal 76 with the lower receptacle 66 is effected during the downward movement of the upper cover 72, pressure from the source 80 is communicated with the chamber 78 so as to increase the pressure therein to a desired value. Continued downward movement of the upper cover 72 serves to increase the pressure within the chamber 78 by decreasing the volume of the air chamber. Also, in conjunction with continued downward movement of the upper cover 72 by the hydraulic ram 70, the ends of the piston rods of the units 10 will be engaged by suitable fixtures 82 mounted within the upper end of the cover. In this way, during the continued downward movement of the cover not only is the pressure within the chamber increased, but a simultaneous inward movement of the piston rods will also take place. This inward movement of the piston rods has the effect of tending to move the annular sealing members 38 inwardly therewith, by friction, thus assisting in the movement of the sealing members against the associated springs 46 when sufficient air pressure is built up within the chamber 78 during the downward movement. The inward movement of the piston rods serve to effect a slight mechanical movement in the portion of the annular sealing members 38 adjacent the central apertures of the annular walls 42 thus presenting an increase in the area upon which the pressure within the chamber 78 can act. This action helps to initiate complete movement of the sealing members 38 away from their associated annular walls 42 by the air under pressure within the chamber which then passes within the chambers 14 of the units.

It will be understood that the apparatus 64 has been described in connection with the simultaneous charging of a plurality of units 10. It would be possible in charging a single unit to provide an upper cover which simply sealingly engages the portion of the unit 10 adjacent the piston rod in order to establish a controllable air chamber which communicates with the seal means 28. The cooperating receptacle and cover arrangement is preferred since it is capable of developing air pressures, through decrease in the volume of the chamber 78 by the action of the hydraulic ram greater than may be conveniently available from the source 80. For example, pressures of 1000 p.s.i. and above will sometimes be required, although a wide range may be employed of 100 p.s.i. and above.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

I claim:

1. An air spring comprising a cylindrical tube defining a cylindrical chamber therein, end closure means at one end of said tube sealingly closing one end of said chamber, a piston slidably mounted within said cylindrical tube and dividing said chamber into two portions on opposite sides thereof, said piston being shaped and cooperating with said tube so as to communicate the two portions of said chamber on opposite sides thereof, a piston rod secured at one end to said piston and extending outwardly from one side thereof, rigid means fixedly engaged within the opposite end portion of said tube providing sliding bearing means for said piston rod, an annular wall extending inwardly from the opposite end of said tube in outward axially spaced relation to said sliding bearing means through which said piston rod extends, an annular member of sealing material disposed in sealing engagement with the interior of said annular wall and in sliding sealing engagement with the adjacent exterior periphery of said piston rod, spring means between said rigid means and said annular member for resiliently urging the latter into sealing engagement with said annular wall, said annular member being movable inwardly against the action of said spring means when exteriorly surrounded by air under pressure higher than air contained within said chamber to provide a passage between said annular member and said annular wall through which said chamber is charged with said air under higher pressure, said annular member being disposed in sealing engagement with said annular wall when said chamber is charged with said air under higher pressure and providing the sole exterior seal for preventing egress of said air under higher pressure from said chamber and the sole exterior passage for the ingress of charging air under higher pressure into said chamber.

2. An air spring as defined in claim 1 wherein said rigid means includes a rigid member having a cylindrical exterior periphery engaging the interior periphery of said tube an axial opening defining said sliding bearing means and an outer end portion engaging the adjacent portion of said annular wall, said outer end portion having an annular recess formed therein within which said annular member and said spring means are disposed.

3. An air spring as defined in claim 1 wherein said rigid member is formed of porous sintered iron.

4. An air spring as defined in claim 1 including a rigid spring retaining element between said annular member and said spring means.

5. An air spring as defined in claim 1 wherein said annular sealing member is of outwardly converging trapezoidal configuration in cross-section.

6. An air spring as defined in claim 1 wherein said piston includes an annular groove formed in the exterior periphery thereof, an O-ring seal disposed within said groove in slidably sealing relation to the interior periphery of said tube, and a restricted opening extending between opposite sides thereof for restrictively communicating the two portions of said chamber on opposite sides of said piston.

7. An air spring as defined in claim 1 wherein said piston includes an outer periphery of a shape and size with respect to the interior periphery of said tube to provide passage means therebetween communicating the two portions of said chamber on opposite sides of said piston.

References Cited

UNITED STATES PATENTS

| | | | |
|---|---|---|---|
| 3,307,883 | 3/1967 | Wustenhagen et al. | 267—65 X |
| 2,643,147 | 6/1953 | Funkhouser et al. | 267—1 |
| 3,123,347 | 3/1964 | Stormer et al. | 267—1 |
| 3,127,158 | 3/1964 | Broadwell | 267—1 |
| 3,294,391 | 12/1966 | Smith et al. | 267—64 |

FOREIGN PATENTS

| | | |
|---|---|---|
| 742,104 | 9/1966 | Canada. |

ARTHUR L. LA POINT, *Primary Examiner.*

R. M. WOHLFARTH, *Assistant Examiner.*